US008959281B1

(12) United States Patent  
Malina et al.

(10) Patent No.: US 8,959,281 B1
(45) Date of Patent: Feb. 17, 2015

(54) DATA MANAGEMENT FOR A STORAGE DEVICE

(71) Applicant: Western Digital Technologies, Inc., Irvine, CA (US)

(72) Inventors: James N. Malina, Irvine, CA (US); David M. Hamilton, Trabuco Canyon, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 159 days.

(21) Appl. No.: 13/673,956

(22) Filed: Nov. 9, 2012

(51) Int. Cl.
 *G06F 12/08* (2006.01)
 *G06F 3/06* (2006.01)

(52) U.S. Cl.
 CPC ............ *G06F 3/0685* (2013.01); *G06F 3/0689* (2013.01); *G06F 3/0683* (2013.01); *G06F 12/08* (2013.01)
 USPC ............................ 711/103; 711/114; 711/117

(58) Field of Classification Search
 CPC .................... G06F 12/0246; G06F 2212/7201; G06F 2212/7203; G06F 3/0679; G06F 3/064; G06F 3/0688; G06F 3/0608; G06F 2212/2022; G06F 2212/214; G06F 2212/7207; G06F 2212/7202; G06F 11/1008; G06F 12/0888; G06F 9/4403; G06F 12/0871; G06F 3/0631; G06F 12/02; G06F 12/0292; G06F 12/08; G06F 2212/222; G06F 3/0689; G06F 11/1016; G06F 3/0685; G06F 3/067
 USPC .......................................... 711/162, 117, 114
 See application file for complete search history.

(56) References Cited

U.S. PATENT DOCUMENTS

| 5,333,138 | A | 7/1994 | Richards et al. |
| 5,420,998 | A | 5/1995 | Horning |
| 5,457,786 | A | 10/1995 | Roush |
| 5,471,604 | A | 11/1995 | Hasbun et al. |
| 5,581,785 | A | 12/1996 | Nakamura et al. |
| 5,586,291 | A | 12/1996 | Lasker et al. |
| 5,636,355 | A | 6/1997 | Ramakrishnan et al. |
| 5,682,273 | A | 10/1997 | Hetzler |
| 5,905,901 | A | 5/1999 | Klein |
| 5,913,067 | A | 6/1999 | Klein |
| 5,954,820 | A | 9/1999 | Hetzler |
| 6,018,789 | A | 1/2000 | Sokolov et al. |
| 6,044,439 | A | 3/2000 | Ballard et al. |
| 6,065,095 | A | 5/2000 | Sokolov et al. |
| 6,078,452 | A | 6/2000 | Kittilson et al. |
| 6,081,447 | A | 6/2000 | Lofgren et al. |
| 6,092,149 | A | 7/2000 | Hicken et al. |
| 6,092,150 | A | 7/2000 | Sokolov et al. |

(Continued)

OTHER PUBLICATIONS

U.S. Appl. No. 12/720,568, filed Mar. 9, 2010, 22 pages.

(Continued)

*Primary Examiner* — Hashem Farrokh

(57) ABSTRACT

Data management for a storage device which includes a disk for storing data and a non-volatile memory (NVM) for storing a translation table. The data on the disk is associated with a plurality of logical block addresses (LBAs) and the translation table stored in the NVM maps each of the plurality of LBAs to a respective physical block address (PBA) identifying a physical location on the disk storing the data associated with the LBA. Data associated with at least one LBA is written on the disk and the at least one LBA is added to the translation table with a PBA identifying a physical location on the disk storing the written data.

39 Claims, 11 Drawing Sheets

(56) References Cited

U.S. PATENT DOCUMENTS

| | | |
|---|---|---|
| 6,094,707 A | 7/2000 | Sokolov et al. |
| 6,105,104 A | 8/2000 | Guttmann et al. |
| 6,111,717 A | 8/2000 | Cloke et al. |
| 6,115,200 A | 9/2000 | Allen et al. |
| 6,145,052 A | 11/2000 | Howe et al. |
| 6,175,893 B1 | 1/2001 | D'Souza et al. |
| 6,178,056 B1 | 1/2001 | Cloke et al. |
| 6,191,909 B1 | 2/2001 | Cloke et al. |
| 6,195,218 B1 | 2/2001 | Guttmann et al. |
| 6,205,494 B1 | 3/2001 | Williams |
| 6,208,477 B1 | 3/2001 | Cloke et al. |
| 6,223,303 B1 | 4/2001 | Billings et al. |
| 6,230,233 B1 | 5/2001 | Lofgren et al. |
| 6,236,527 B1 | 5/2001 | Uchiike et al. |
| 6,246,346 B1 | 6/2001 | Cloke et al. |
| 6,249,393 B1 | 6/2001 | Billings et al. |
| 6,256,695 B1 | 7/2001 | Williams |
| 6,262,857 B1 | 7/2001 | Hull et al. |
| 6,263,459 B1 | 7/2001 | Schibilla |
| 6,272,694 B1 | 8/2001 | Weaver et al. |
| 6,275,949 B1 | 8/2001 | Watanabe |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,295,577 B1 | 9/2001 | Anderson et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,429,990 B2 | 8/2002 | Serrano et al. |
| 6,437,935 B1 | 8/2002 | Johnson et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,614,616 B1 | 9/2003 | Michel et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,662,267 B2 | 12/2003 | Stewart |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,725,397 B1 | 4/2004 | Emberty et al. |
| 6,732,241 B2 | 5/2004 | Riedel |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,754,021 B2 | 6/2004 | Kisaka et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,798,599 B2 | 9/2004 | Dykes et al. |
| 6,799,274 B1 | 9/2004 | Hamlin |
| 6,807,630 B2 | 10/2004 | Lay et al. |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,845,456 B1 | 1/2005 | Menezes et al. |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,909,574 B2 | 6/2005 | Aikawa et al. |
| 6,910,099 B1 | 6/2005 | Wang et al. |
| 6,928,470 B1 | 8/2005 | Hamlin |
| 6,928,518 B2 | 8/2005 | Talagala |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |

(56) References Cited

U.S. PATENT DOCUMENTS

| | | |
|---|---|---|
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,620 B2 | 2/2006 | Avraham et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,017,037 B2 | 3/2006 | Fortin et al. |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,076,605 B1 | 7/2006 | Son |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,107,444 B2 | 9/2006 | Fortin et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,139,933 B2 | 11/2006 | Hsu et al. |
| 7,142,385 B2 | 11/2006 | Shimotono et al. |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,206,948 B2 | 4/2007 | Brauer |
| 7,215,496 B1 | 5/2007 | Kupferman et al. |
| 7,215,771 B1 | 5/2007 | Hamlin |
| 7,231,198 B2 | 6/2007 | Loughran |
| 7,237,054 B1 | 6/2007 | Cain et al. |
| 7,240,161 B1 | 7/2007 | Boyle |
| 7,249,365 B1 | 7/2007 | Price et al. |
| 7,254,721 B1 | 8/2007 | Tobias et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,275,166 B2 | 9/2007 | Kaiju et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,334,082 B2 | 2/2008 | Grover et al. |
| 7,340,647 B2 | 3/2008 | Aasheim et al. |
| 7,346,790 B1 | 3/2008 | Klein |
| 7,350,105 B2 | 3/2008 | Aasheim et al. |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,395,452 B2 | 7/2008 | Nicholson et al. |
| 7,404,013 B1 | 7/2008 | Masiewicz |
| 7,406,545 B1 | 7/2008 | Rothberg et al. |
| 7,411,757 B2 | 8/2008 | Chu et al. |
| 7,415,571 B1 | 8/2008 | Hanan |
| 7,421,552 B2 | 9/2008 | Long |
| 7,425,810 B2 | 9/2008 | Hobbet et al. |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,461,202 B2 | 12/2008 | Forrer, Jr. et al. |
| 7,468,854 B2 | 12/2008 | Yamashita et al. |
| 7,471,483 B1 | 12/2008 | Ferris et al. |
| 7,471,486 B1 | 12/2008 | Coker et al. |
| 7,472,222 B2 | 12/2008 | Auerbach et al. |
| 7,477,477 B2 | 1/2009 | Maruchi et al. |
| 7,483,234 B2 | 1/2009 | Shimozato |
| 7,486,060 B1 | 2/2009 | Bennett |
| 7,496,493 B1 | 2/2009 | Stevens |
| 7,509,471 B2 | 3/2009 | Gorobets |
| 7,516,346 B2 | 4/2009 | Pinheiro et al. |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,552,347 B2 | 6/2009 | Schutte |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,610,438 B2 | 10/2009 | Lee et al. |
| 7,610,445 B1 | 10/2009 | Manus et al. |
| 7,613,876 B2 | 11/2009 | Bruce et al. |
| 7,619,841 B1 | 11/2009 | Kupferman |
| 7,620,773 B2 | 11/2009 | Nicholson et al. |
| 7,644,231 B2 | 1/2010 | Recio et al. |
| 7,647,513 B2 | 1/2010 | Tobias et al. |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |

(56) References Cited

U.S. PATENT DOCUMENTS

| | | |
|---|---|---|
| 7,685,360 B1 | 3/2010 | Brunnett et al. |
| 7,688,540 B1 | 3/2010 | Mei et al. |
| 7,698,586 B2 | 4/2010 | Kim et al. |
| 7,719,785 B2 | 5/2010 | Taniguchi et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,752,491 B1 | 7/2010 | Liikanen et al. |
| 7,760,458 B1 | 7/2010 | Trinh |
| 7,768,776 B1 | 8/2010 | Szeremeta et al. |
| 7,774,556 B2 | 8/2010 | Karamcheti et al. |
| 7,797,487 B2 | 9/2010 | Lubbers et al. |
| 7,804,657 B1 | 9/2010 | Hogg et al. |
| 7,813,954 B1 | 10/2010 | Price et al. |
| 7,817,372 B2 | 10/2010 | Takahashi |
| 7,827,320 B1 | 11/2010 | Stevens |
| 7,835,104 B2 | 11/2010 | Yamashita et al. |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,890,696 B2 | 2/2011 | Lawson |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,984,259 B1 | 7/2011 | English |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,060,707 B2 | 11/2011 | Fairhurst et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,098,451 B2 | 1/2012 | Graef |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,307 B2 | 3/2012 | Kim et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,169,726 B2 | 5/2012 | Wilson |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,244,975 B2 | 8/2012 | DeCenzo |
| 8,245,003 B2 | 8/2012 | Suzuki et al. |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,286,018 B2 | 10/2012 | Chang et al. |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,341,337 B1 | 12/2012 | Ong et al. |
| 8,341,339 B1 | 12/2012 | Boyle et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,458,526 B2 | 6/2013 | Dalphy et al. |
| 8,462,466 B2 | 6/2013 | Huber |
| 8,467,151 B1 | 6/2013 | Huber |
| 8,489,841 B1 | 7/2013 | Strecke et al. |
| 8,493,679 B1 | 7/2013 | Boguslawski et al. |
| 8,498,074 B1 | 7/2013 | Mobley et al. |
| 8,499,198 B1 | 7/2013 | Messenger et al. |
| 8,512,049 B1 | 8/2013 | Huber et al. |
| 8,514,506 B1 | 8/2013 | Li et al. |
| 8,531,791 B1 | 9/2013 | Reid et al. |
| 8,554,741 B1 | 10/2013 | Malina |
| 8,560,759 B1 | 10/2013 | Boyle et al. |
| 8,565,053 B1 | 10/2013 | Chung |
| 8,576,511 B1 | 11/2013 | Coker et al. |
| 8,578,100 B1 | 11/2013 | Huynh et al. |
| 8,578,242 B1 | 11/2013 | Burton et al. |
| 8,589,773 B1 | 11/2013 | Wang et al. |
| 8,593,753 B1 | 11/2013 | Anderson |
| 8,595,432 B1 | 11/2013 | Vinson et al. |
| 8,599,510 B1 | 12/2013 | Fallone |
| 8,601,248 B2 | 12/2013 | Thorsted |
| 8,611,032 B2 | 12/2013 | Champion et al. |
| 8,612,644 B2 | 12/2013 | Kumasawa et al. |
| 8,612,650 B1 | 12/2013 | Carrie et al. |
| 8,612,706 B1 | 12/2013 | Madril et al. |
| 8,612,798 B1 | 12/2013 | Tsai |
| 8,619,383 B1 | 12/2013 | Jung et al. |
| 8,621,115 B1 | 12/2013 | Bombet et al. |
| 8,621,133 B1 | 12/2013 | Boyle |
| 8,626,463 B2 | 1/2014 | Stevens et al. |
| 8,630,052 B1 | 1/2014 | Jung et al. |
| 8,630,056 B1 | 1/2014 | Ong |
| 8,631,188 B1 | 1/2014 | Heath et al. |
| 8,634,158 B1 | 1/2014 | Chahwan et al. |
| 8,635,412 B1 | 1/2014 | Wilshire |
| 8,640,007 B1 | 1/2014 | Schulze |
| 8,654,619 B1 | 2/2014 | Cheng |

(56) References Cited

U.S. PATENT DOCUMENTS

| | | |
|---|---|---|
| 8,661,193 B1 | 2/2014 | Cobos et al. |
| 8,667,248 B1 | 3/2014 | Neppalli |
| 8,670,205 B1 | 3/2014 | Malina et al. |
| 8,683,295 B1 | 3/2014 | Syu et al. |
| 8,683,457 B1 | 3/2014 | Hughes et al. |
| 8,687,306 B1 | 4/2014 | Coker et al. |
| 8,693,133 B1 | 4/2014 | Lee et al. |
| 8,694,841 B1 | 4/2014 | Chung et al. |
| 8,699,159 B1 | 4/2014 | Malina |
| 8,699,171 B1 | 4/2014 | Boyle |
| 8,699,172 B1 | 4/2014 | Gunderson et al. |
| 8,699,175 B1 | 4/2014 | Olds et al. |
| 8,699,185 B1 | 4/2014 | Teh et al. |
| 8,700,850 B1 | 4/2014 | Lalouette |
| 8,719,501 B2 * | 5/2014 | Flynn et al. ............... 711/118 |
| 8,743,502 B1 | 6/2014 | Bonke et al. |
| 8,749,910 B1 | 6/2014 | Dang et al. |
| 8,751,699 B1 | 6/2014 | Tsai et al. |
| 8,755,141 B1 | 6/2014 | Dang |
| 8,755,143 B2 | 6/2014 | Wilson et al. |
| 8,756,361 B1 | 6/2014 | Pruett et al. |
| 8,756,382 B1 | 6/2014 | Carlson et al. |
| 8,769,593 B1 | 7/2014 | Elliott et al. |
| 8,773,802 B1 | 7/2014 | Anderson et al. |
| 8,775,720 B1 | 7/2014 | Meyer et al. |
| 8,780,478 B1 | 7/2014 | Huynh et al. |
| 8,782,334 B1 | 7/2014 | Boyle et al. |
| 8,793,532 B1 | 7/2014 | Tsai et al. |
| 8,797,669 B1 | 8/2014 | Burton |
| 8,799,977 B1 | 8/2014 | Kapner, III et al. |
| 2002/0083264 A1 | 6/2002 | Coulson |
| 2003/0140198 A1 | 7/2003 | Ninose et al. |
| 2003/0145167 A1 * | 7/2003 | Tomita ............... 711/114 |
| 2005/0108473 A1 | 5/2005 | Le Moal et al. |
| 2005/0120251 A1 | 6/2005 | Fukumori |
| 2006/0075185 A1 | 4/2006 | Azzarito et al. |
| 2006/0195657 A1 | 8/2006 | Tien et al. |
| 2007/0006021 A1 | 1/2007 | Nicholson et al. |
| 2007/0050540 A1 | 3/2007 | Klein |
| 2007/0162693 A1 | 7/2007 | Nam |
| 2008/0024899 A1 | 1/2008 | Chu et al. |
| 2008/0040537 A1 | 2/2008 | Kim |
| 2008/0049354 A1 * | 2/2008 | Nitta ............... 360/72.1 |
| 2008/0059694 A1 | 3/2008 | Lee |
| 2008/0130156 A1 | 6/2008 | Chu et al. |
| 2008/0177938 A1 | 7/2008 | Yu |
| 2008/0222353 A1 | 9/2008 | Nam et al. |
| 2008/0256287 A1 | 10/2008 | Lee et al. |
| 2008/0288714 A1 | 11/2008 | Salomon et al. |
| 2008/0307270 A1 | 12/2008 | Li |
| 2009/0019218 A1 | 1/2009 | Sinclair et al. |
| 2009/0024793 A1 | 1/2009 | Fontenot et al. |
| 2009/0031072 A1 | 1/2009 | Sartore |
| 2009/0089501 A1 | 4/2009 | Ahn et al. |
| 2009/0103203 A1 | 4/2009 | Yoshida |
| 2009/0106518 A1 | 4/2009 | Dow |
| 2009/0113702 A1 | 5/2009 | Hogg |
| 2009/0144501 A2 | 6/2009 | Yim et al. |
| 2009/0150599 A1 | 6/2009 | Bennett |
| 2009/0172249 A1 | 7/2009 | Matthews |
| 2009/0172324 A1 | 7/2009 | Han et al. |
| 2009/0172499 A1 | 7/2009 | Olbrich et al. |
| 2009/0198940 A1 | 8/2009 | Ash et al. |
| 2009/0213486 A1 | 8/2009 | Takahashi |
| 2009/0249168 A1 | 10/2009 | Inoue |
| 2009/0271562 A1 | 10/2009 | Sinclair |
| 2009/0327603 A1 | 12/2009 | McKean et al. |
| 2010/0067138 A1 | 3/2010 | Ooi et al. |
| 2010/0088459 A1 | 4/2010 | Arya et al. |
| 2010/0122030 A1 | 5/2010 | Peters et al. |
| 2010/0169541 A1 | 7/2010 | Freikorn |
| 2010/0191922 A1 | 7/2010 | Dickey et al. |
| 2010/0195243 A1 | 8/2010 | Zhu et al. |
| 2010/0306551 A1 | 12/2010 | Meyer et al. |
| 2010/0325352 A1 | 12/2010 | Schuette et al. |
| 2011/0010490 A1 | 1/2011 | Kwon et al. |
| 2011/0106804 A1 | 5/2011 | Keeler et al. |
| 2011/0226729 A1 | 9/2011 | Hogg |
| 2011/0283128 A1 | 11/2011 | Farhan et al. |
| 2012/0159042 A1 | 6/2012 | Lott et al. |
| 2012/0170435 A1 * | 7/2012 | Trantham ............... 369/53.42 |
| 2012/0275050 A1 | 11/2012 | Wilson et al. |
| 2012/0281963 A1 | 11/2012 | Krapf et al. |
| 2012/0290779 A1 * | 11/2012 | Eleftheriou et al. ......... 711/103 |
| 2012/0317338 A1 | 12/2012 | Yi et al. |
| 2012/0324980 A1 | 12/2012 | Nguyen et al. |
| 2013/0024650 A1 | 1/2013 | Ambat et al. |
| 2013/0117520 A1 * | 5/2013 | Ryu ............... 711/165 |
| 2013/0173850 A1 * | 7/2013 | Song ............... 711/103 |
| 2013/0290668 A1 * | 10/2013 | Na ............... 711/203 |
| 2014/0201424 A1 | 7/2014 | Chen et al. |

OTHER PUBLICATIONS

Hannes Payer, Marco A.A. Sanvido, Zvonimir Z. Bandic, Christoph M. Kirsch, "Combo Drive: Optimizing Cost and Performance in a Heterogeneous Storage Device", http://csl.cse.psu.edu/wish2009_papers/Payer.pdf.

Gokul Soundararajan, Vijayan Prabhakaran, Mahesh Balakrishan, Ted Wobber, "Extending SSD Lifetimes with Disk-Based Write Caches", http://research.microsoft.com/pubs/115352/hybrid.pdf, Feb. 2010.

Xiaojian Wu, A. L. Narasimha Reddy, "Managing Storage Space in a Flash and Disk Hybrid Storage System", http://www.ee.tamu.edu/~reddy/papers/mascots09.pdf.

Tao Xie, Deepthi Madathil, "SAIL: Self-Adaptive File Reallocation on Hybrid Disk Arrays", The 15th Annual IEEE International Conference on High Performance Computing (HIPC 2008), Bangalore, India, Dec. 17-20, 2008.

Non-Volatile Memory Host Controller Interface revision 1.0 specification available for download at http://www.intel.com/standards/nvmhci/index.htm. Ratified on Apr. 14, 2008, 65 pages.

DongKyu Lee; Koh, K.; "PDC-NH: Popular data concentration on NAND flash and hard disk drive," 2009 10th IEEE/ACM International Conference on Grid Computing, pp. 196-200, Oct. 13-15, 2009.

Boyle, et. al., U.S. Appl. No. 12/824,959, filed Jun. 28, 2010, 21 pages.

Boyle, et. al., U.S. Appl. No. 13/105,800, filed May 11, 2011, 19 pages.

Wilkins, et. al., U.S. Appl. No. 13/157,111, filed Jun. 9, 2011, 16 pages.

* cited by examiner

| Translation Table 20 ||
|---|---|
| LBA | PBA |
| ⋮ | ⋮ |
| 4,320 | 2,530 |
| 4,321 | 2,531 |
| 4,328 | 2,532 |
| 4,329 | 2,533 |
| 586,231 | 425,624 |
| 586,232 | 425,625 |
| 586,233 | 425,626 |

FIG. 4

| Write Log 22a |||
|---|---|---|
| LBA | PBA | Sector Count |
| 586,238 | 425,631 | 7 |
| 586,294 | 425,687 | 56 |

FIG. 5

| Footer Metadata 28 | | |
|---|---|---|
| LBA | PBA | Sector Count |
| 4,329 | 2,533 | 42 |
| 586,245 | 425,632 | 18 |

FIG. 6

Power Loss Process

US 8,959,281 B1

DATA MANAGEMENT FOR A STORAGE DEVICE

BACKGROUND

Storage devices are often used to record data on or to reproduce data from a recording media. A storage device can include a rotating magnetic disk as one type of recording media. In addition to a magnetic disk, a storage device can include a second type of recording media, such as a solid state, non-volatile memory. Storage devices including both a disk and a solid state non-volatile memory may be referred to as a hybrid drive.

The storage device industry is always trying to increase the recording density of the disk, or in other words, the amount of data that can be stored in a given area on the disk. Shingled magnetic recording (SMR) has recently been introduced as a way of increasing the number of tracks per inch (TPI) by making the tracks narrower. Since it is technologically easier to read narrow tracks than to write narrow tracks, SMR increases TPI by using a relatively wide write head with a stronger magnetic field to overlap tracks like roof shingles. The non-overlapping portion then serves as a narrow track that can be read by a narrower read head.

Although a higher number of TPI is ordinarily possible with SMR, the overlap in tracks can create a problem when writing data since new writes to a previously overlapped track affects data written in the overlapping track. For this reason, tracks are usually sequentially written to avoid affecting previously written data. Such sequential writing can create new data management issues not addressed in conventional storage devices.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed. Reference numbers are reused throughout the drawings to indicate correspondence between referenced elements.

FIG. 4 depicts a translation table according to an embodiment.

FIG. 5 depicts a write log according to an embodiment.

FIG. 6 depicts footer metadata according to an embodiment.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

System Environment

Figure 1:
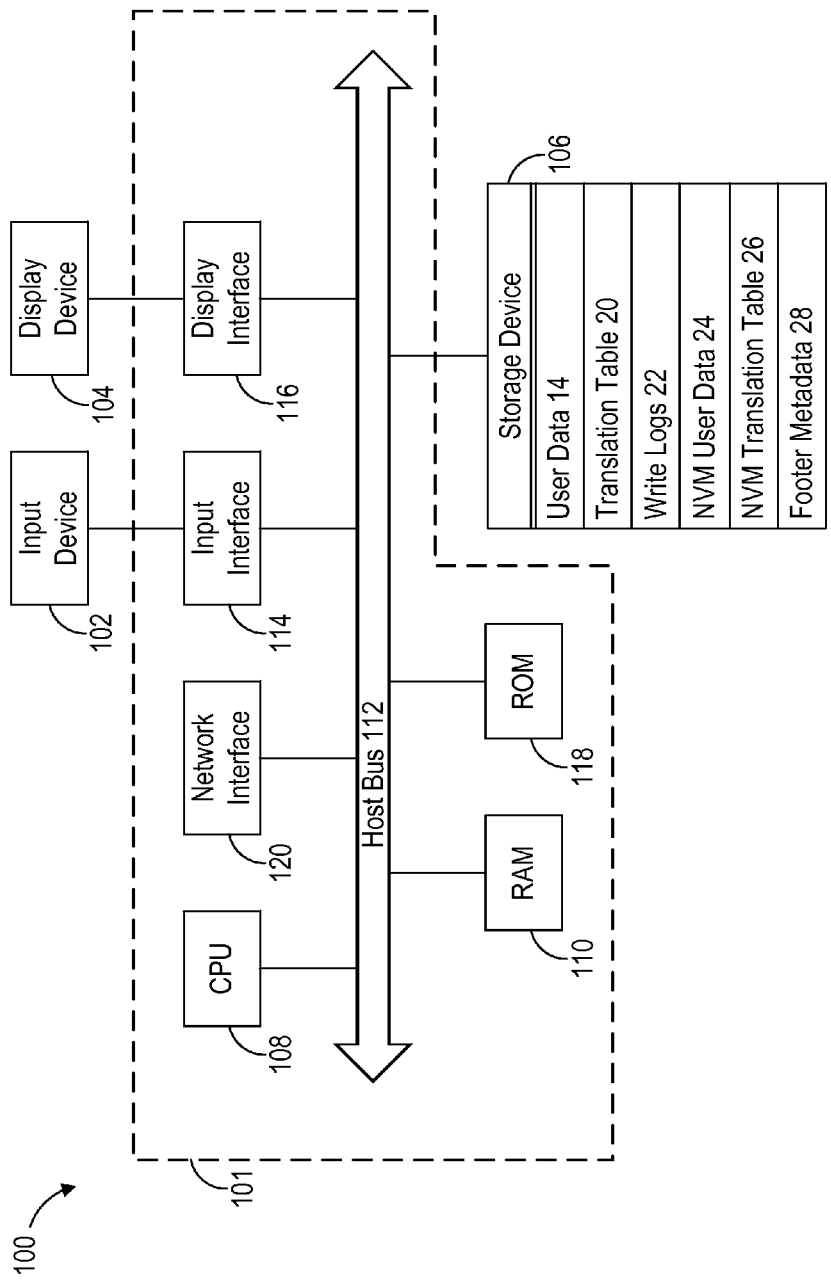
FIG. 1 is a block diagram depicting a computer system including a storage device according to an embodiment.

FIG. 1 shows computer system 100 which includes host 101, input device 102, display device 104 and storage device 106. Computer system 100 can be, for example, a cloud storage device, personal computer system, or other electronic device. In this regard, computer system 100 may be a stand-alone system or part of a network. Input device 102 can be a keyboard, scroll wheel, or pointing device allowing a user of computer system 100 to enter information and commands to computer system 100, or to allow a user to manipulate objects displayed on display device 104. In other embodiments, input device 102 and display device 104 can be combined into a single component, such as a touch-screen that displays objects and receives user input.

In the embodiment of FIG. 1, host 101 includes central processing unit (CPU) 108 which can be implemented using one or more processors for executing instructions including a microcontroller, a Digital Signal Processor (DSP), an Application Specific Integrated Circuit (ASIC), a Field Programmable Gate Array (FPGA), hard-wired logic, analog circuitry and/or a combination thereof. CPU 108 interfaces with host bus 112. Also interfacing with host bus 112 are random access memory (RAM) 110, input interface 114 for input device 102, display interface 116 for display device 104, read only memory (ROM) 118, network interface 120 and storage device 106.

RAM 110 interfaces with host bus 112 so as to provide information stored in RAM 110 to CPU 108 during execution of instructions in software programs. More specifically, CPU 108 first loads computer-executable instructions from storage device 106 or another storage device into a region of RAM 110. CPU 108 can then execute the stored process instructions from RAM 110. Data such as data to be stored in storage device 106 or data retrieved from storage device 106 can be stored in RAM 110 so that the data can be accessed by CPU 108 during execution of software programs to the extent that such software programs have a need to access and/or modify the data.

As discussed with reference to FIG. 2 below, in one embodiment storage device 106 is a hybrid drive including both a magnetic disk (i.e., disk 200 in FIG. 2) and a solid state non-volatile memory (NVM) (i.e., NVM 128 in FIG. 2). In this regard, storage device 106 includes both user data 14 written on disk 200 and NVM user data 24 stored in NVM 128. User data 14 and NVM user data 24 can include data used by host 101, such as an operating system, device drivers, application programs, and data files such as video files or word processing files. In addition, NVM user data 24 can include a cached version of user data 14 or portions thereof.

Storage device 106 also includes NVM translation table 26 which can include a mapping between logical addresses and physical addresses for data stored in NVM 128. More specifically, NVM translation table 26 can map logical block addresses (LBAs) used by host 101 for addressing data to physical block addresses (PBAs) used by storage device 106 to address physical storage blocks (not shown) in NVM 128. As understood by those of ordinary skill in the art, NVM translation table 26 can be used to perform LBA indirection or other methods to promote an even wear-leveling of physical storage blocks in NVM 128. Such even wear-leveling ordinarily increases the usable life of NVM 128.

In addition, storage device 106 includes translation table 20, write logs 22, and footer metadata 28 for implementing various example processes disclosed herein. Translation table 20, write logs 22, and footer metadata 28 are described in more detail below with reference to FIGS. 4, 5, and 6, respectively.

Those of ordinary skill in the art will appreciate that the disclosed processes for managing data may be implemented in other environments. In some embodiments, storage device 106 can include more or less than those elements shown in FIG. 1. For example, some embodiments may not include NVM user data 24 since the example data management processes disclosed herein are not necessarily implemented with a hybrid drive having a large capacity NVM. Instead, the data management processes can be implemented in other embodiments with a storage device having a relatively small capacity NVM that does not store NVM user data 24.

Storage Device Overview

Figure 2:
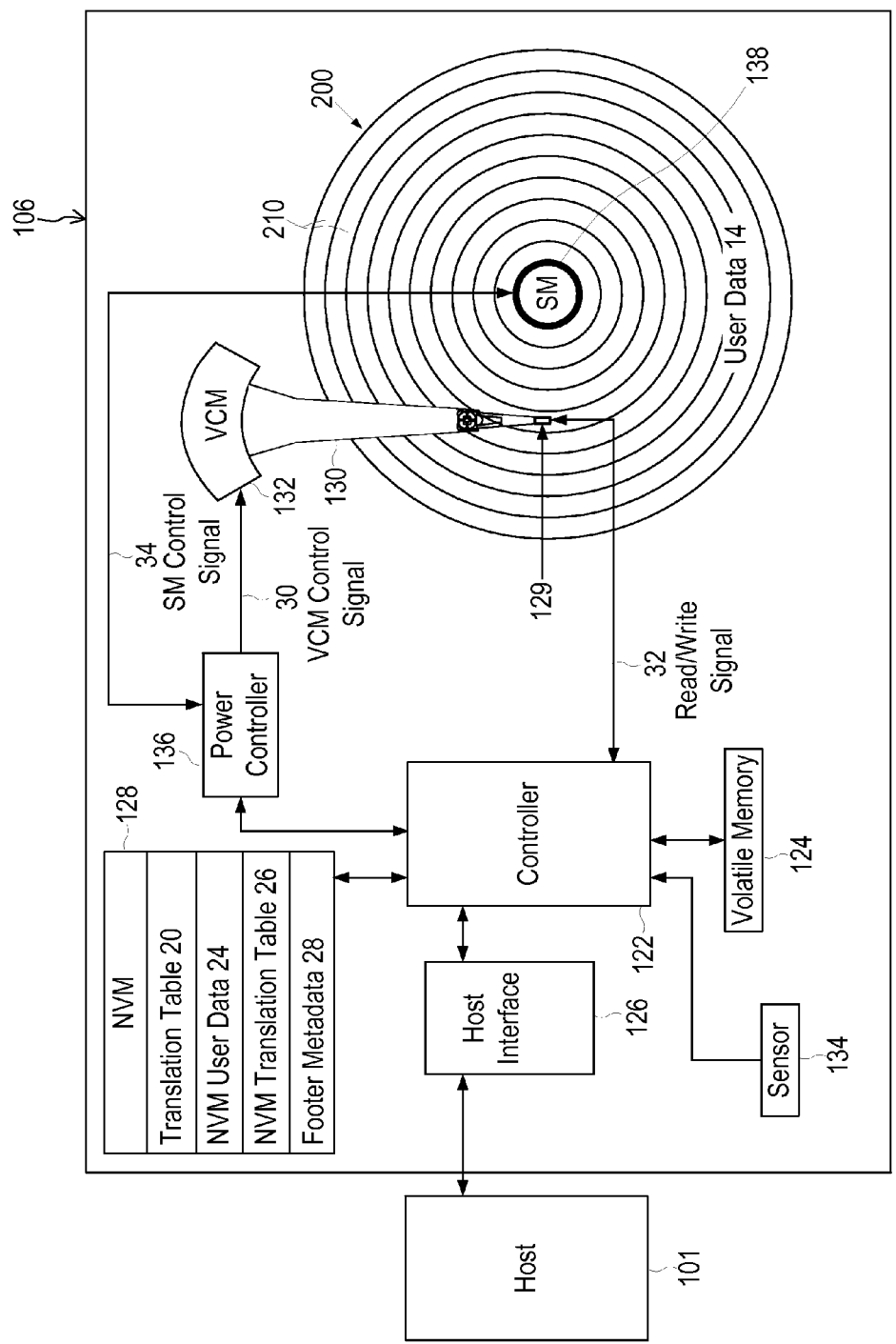
FIG. 2 is a block diagram depicting the storage device of FIG. 1.

FIG. 2 illustrates a block diagram of storage device 106 according to one example embodiment. As shown in FIG. 2, storage device 106 includes controller 122 which can perform various operations of storage device 106 described herein. Controller 122 can be implemented using one or more processors for executing instructions and can include a microcontroller, a Digital Signal Processor (DSP), an Application Specific Integrated Circuit (ASIC), a Field Programmable Gate Array (FPGA), hard-wired logic, analog circuitry and/or a combination thereof.

In the example of FIG. 2, storage device 106 includes rotating magnetic disk 200 and head 129 connected to the distal end of actuator arm 130 which is rotated about a pivot by voice coil motor (VCM) 132 to position head 129 over disk 200. Head 129 includes at least a read element (i.e., read element 140 in FIG. 3) for reading data from disk 200, and a write element (i.e., write element 142 in FIG. 3) for writing data on disk 200. Disk 200 comprises a number of radial spaced, concentric tracks 210 for storing data (e.g., user data 14). Tracks 210 can be grouped together into zones of tracks (e.g., zones 224, 226, and 228 in FIG. 3), with each track 210 divided into a number of sectors (i.e., sectors 222 in FIG. 3) that are spaced circumferentially along tracks 210.

Storage device 106 also includes spindle motor (SM) 138 for rotating disk 200 during read/write operations. As described in more detail with reference to FIG. 10 below, SM 138 is also configured to generate electric power from a continued rotation of disk 200 when there is an unexpected loss of power to storage device 106.

SM 138 and VCM 132 are connected to power controller 136 which includes circuitry for converting control signals received from controller 122 into VCM control signal 30 and SM control signal 34. These control signals can be, for example, control currents for controlling the rotation of VCM 132 and SM 138. Power controller 136 is also configured to receive generated power from SM 138 after an unexpected power loss and, in turn, supply power to controller 122.

Storage device 106 also includes host interface 126 and volatile memory 124, which can include, for example, a DRAM. Data stored in volatile memory 124 includes data read from disk 200, data to be written to disk 200, and/or instructions for controlling storage device 106. Host interface 126 is configured to interface storage device 106 with host 101 and may interface according to the serial advanced technology attachment (SATA) standard or other standards such as serial attached SCSI (SAS). As will be appreciated by those of ordinary skill in the art, host interface 126 can be included as part of controller 122.

In addition, storage device 106 includes solid state non-volatile memory (NVM) 128 for storing data such as translation table 20, footer metadata 28, NVM user data 24, and NVM translation table 26. In other embodiments, NVM 128 can include components not shown in the example of FIG. 2, such as firmware for controlling storage device 106.

While the description herein refers to NVM generally, it is understood that NVM may comprise one or more of various types of solid state non-volatile memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

In one embodiment, controller 122 is connected to sensor 134 which is configured to detect an environmental condition, such as a vibration condition. When sensor 134 detects the environmental condition, sensor 134 can transmit a signal to controller 122 indicating detection of the environmental condition.

In operation, controller 122 writes data to and reads data from disk 200 in response to commands from host 101 received via host interface 126. When controller 122 receives a write command from host 101 with data to be written to disk 200, controller 122 temporarily holds the received data in volatile memory 124. To write data to disk 200, controller 122 positions head 129 over disk 200 by controlling power controller 136 to send VCM control signal 30 to VCM 132. Controller 122 positions head 129 based on position information read from disk 200. At the same time, controller 122 causes SM 138 to rotate disk 200 by controlling power controller 136 to send SM control signal 34 to SM 138.

Controller 122 processes data to be written to disk 200 into write signal 32, which is output to head 129. For its part, a write element (i.e., write element 142 in FIG. 3) of head 129 converts write signal 32 into a magnetic field that magnetizes the surface of disk 200 based upon write signal 32, thereby magnetically writing data on disk 200. Controller 122 may notify host 101 via host interface 126 after data for the write command has been successfully written on disk 200.

When controller 122 receives a read command from host 101, requesting data written on disk 200, controller 122 positions head 129 on disk 200 by controlling power controller 136 to send VCM control signal 30 to VCM 132. At the same time, controller 122 causes SM 138 to rotate disk 200 by controlling power controller 136 to send SM control signal 34 to SM 138. A read element (i.e., read element 140 in FIG. 3) of head 129 generates read signal 32 based upon the magnetization of the disk surface under head 129, and controller 122 processes read signal 32 into data.

SMR Disk Example

Figure 3:
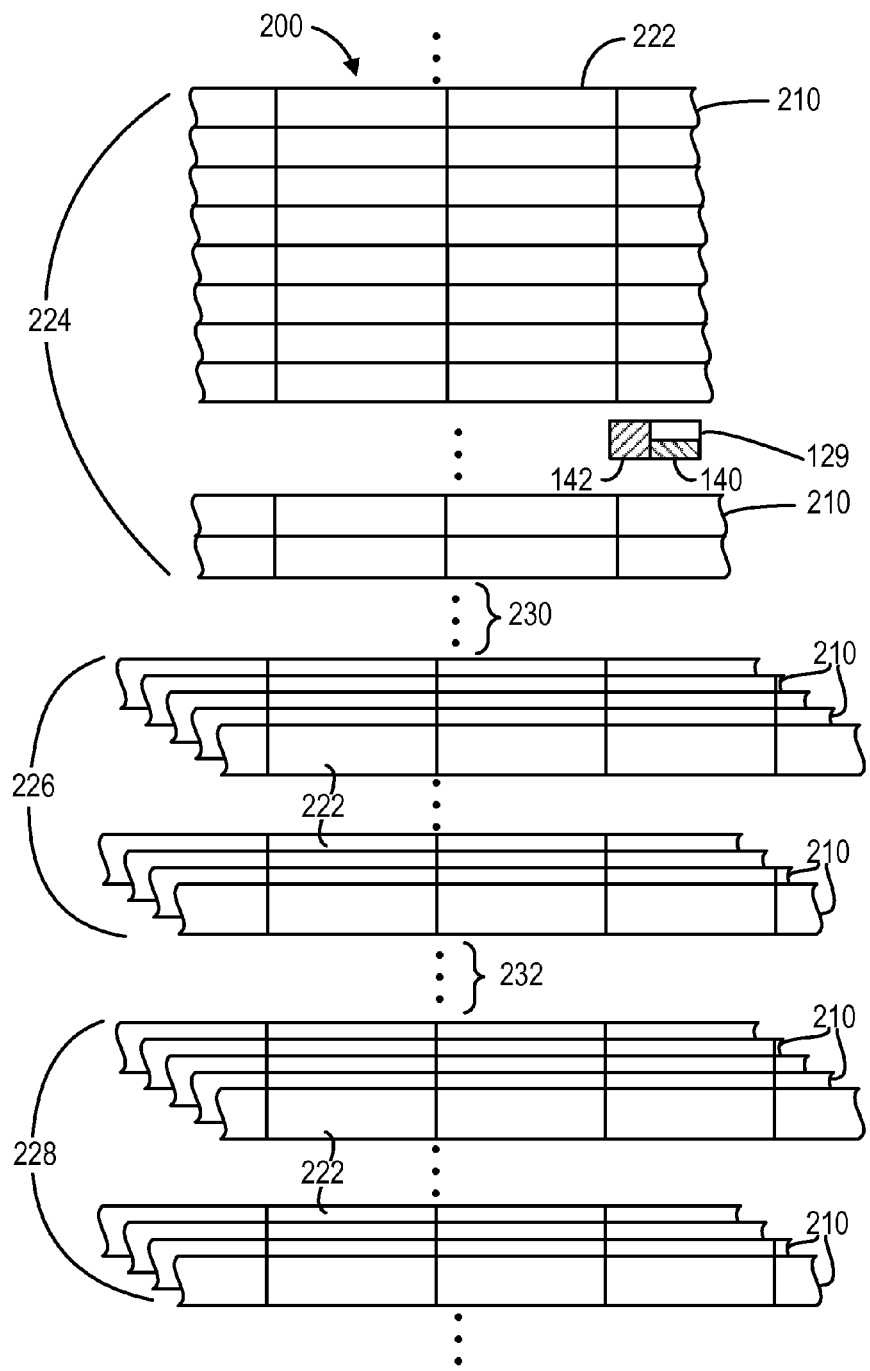
FIG. 3 illustrates a portion of a disk written by a head according to an embodiment.

FIG. 3 illustrates an example configuration in which a portion of disk 200 is depicted to include three zones of tracks 210. As shown in the example of FIG. 3, zone 224 is a zone of non-overlapping tracks 210 written by write element 142 of head 129, and zones 226 and 228 are zones of overlapping tracks 210 also written by write element 142 of head 129.

Zones of non-overlapping tracks, such as zone 224, are referred to herein as conventional magnetic recording (CMR) zones. Zones of overlapping tracks, such as zones 226 and 228, are referred to herein as SMR zones.

As shown in FIG. 3, each track 210 includes a plurality of sectors 222 for storing a fixed amount of data, such as 2,048 bytes, 1,024 bytes or 4,096 bytes. Head 129 includes read element 140 which generates read signal 32 based upon the magnetization of sectors 222. Head 129 also includes write element 142 which converts write signal 32 into a magnetic field that magnetically writes data in sectors 222. In the example of FIG. 3, write element 142 is substantially wider than read element 140 so as to facilitate SMR in SMR zones 226 and 228. In particular, the non-overlapping portions of tracks 210 in SMR zones 226 and 228 form relatively narrow tracks that can be read by read element 140. Accordingly, SMR zones 226 and 228 have a higher number of tracks per inch (TPI) than CMR zone 224. In alternative embodiments, the ratio of the width of the write element to the width of the read element can differ. For example, a write element can be four or five times the width of the read element.

As shown in FIG. 3, SMR zone 226 is separated from CMR zone 224 by gap 230. In addition, SMR zone 226 is separated from SMR zone 228 by gap 232. Gaps 230 and 232 include empty tracks, or tracks without data, that serve as buffers between the zones so as to serve several purposes. In the case of SMR zones 226 and 228, gap 232 allows for the writing of data in SMR zone 226 without overwriting data in a track in adjacent SMR zone 228. SMR zones are generally sequentially written due to the overlapping of the tracks. More specifically, without sequentially writing an SMR zone, the overlapping of tracks can create a problem since new writes to a previously overlapped track would also affect data written in the overlapping track. By having gaps 230 and 232, the zones are separated so as to limit the amount of disk 200 that would need to be sequentially rewritten when only a particular zone requires rewriting.

In addition, SMR zones are generally sequentially written to reduce the effect of adjacent track interference (ATI) from write element 142. The magnetic field from write element 142 can affect data in adjacent tracks in either an inside diameter direction or an outside diameter direction of the disk depending on a direction of overlap. As noted above, this sequential writing of SMR media can present new data management concerns. A solid state non-volatile memory, such as NVM 128, can be configured to accommodate SMR data management concerns as discussed below.

Example Data Management Mechanisms

FIG. 4 illustrates an example of translation table 20, which can be stored in NVM 128. In the example embodiment of FIG. 4, translation table 20 includes LBAs used by host 101 to address data stored on disk 200. In one embodiment, the shingled configuration on disk 200 facilitates a writing pattern in which address indirection is used, such that translation table 20 is used to map the LBAs to the PBAs to which data is written. In this example, each LBA in translation table 20 is mapped to a PBA corresponding to a sector 222 where data associated with the LBA is stored. When performing a read command, controller 122 can access translation table 20 to provide information on where to position head 129 on disk 200. When performing a write command, controller 122 can update translation table 20 with new LBAs and/or PBAs for new data written on disk 200.

As shown in FIG. 4, translation table 20 includes LBA to PBA mapping for two different zones, such as SMR zones 226 and 228 in FIG. 3. For example, LBAs 4,320 to 4,329 can correspond to sectors 222 in SMR zone 226, while LBAs 586,231 to 586,233 can correspond to sectors 222 in SMR zone 228. As will be appreciated by those of ordinary skill in the art, the addresses shown in FIG. 4 can vary by different amounts to take account of various properties of disk 200 such as sector data alignment, servo wedges, or defective sectors. Other embodiments may include separate translation tables for each zone or may include a different number of zones in a combined translation table.

By storing translation table 20 in NVM 128, it is ordinarily possible to access translation table 20 more quickly during operation of storage device 106 than if translation table 20 was stored on disk 200. This is due in part to quicker access times generally associated with solid state NVM.

In addition, when disk 200 is written with new data, translation table 20 can be periodically updated to reflect LBAs and/or PBAs for newly written data. By storing translation table 20 in NVM 128, it is ordinarily possible to simultaneously update translation table 20 while writing on disk 200. This ordinarily improves performance because it is not necessary to reposition head 129 to a different area of disk 200 to update translation table 20 during a write operation.

Storing translation table 20 in NVM 128 also improves a command execution time when storage device 106 is being powered up or awoken from an idle state where disk 200 is not rotating. For example, storage device 106 may read translation table 20 while disk 200 is being spun up to a final speed and thereby shorten the amount of time to complete a read or write command after storage device 106 has been in a powered down or idle state. In one embodiment, translation table 20 may be combined with NVM translation table 26, which maps addresses for data stored in NVM 128.

FIG. 5 illustrates an example of a write log 22a written to disk 200 to log write commands in a particular track 210 of SMR zone 228. Write logs 22 can be written, for example, at the start of each track 210 to log each write command that wrote data on the previous track. As shown in the example of FIG. 5, write logs 22 can include entries indicating a last LBA, last PBA, and a sector length for each write command performed on a particular track. In the event of an unexpected power loss, translation table 20 can be rebuilt using write logs 22 to protect data on disk 200 from inadvertently being overwritten with a new write command. As understood by those of ordinary skill in the art, other arrangements for periodically logging write commands can be made in other embodiments, such as having one write log that is updated based on an amount of data written in a particular zone.

Write log 28a of FIG. 5 can be located at the beginning of a particular track 210 in SMR zone 228. As shown in FIG. 5, write log 28a logs two write commands ending at LBAs: 586,238 and 586,294. The sector length for the first write command is seven sectors and the sector length for the second write command is 56 sectors.

During operation of storage device 106, there may be a need for more frequent logging of write commands than that provided by write logs 22. For some commands, such as forced unit access (FUA) write commands, log data is generated after each write command as opposed to at the beginning of each track 210. In the present disclosure, footer metadata 28 can provide a more frequent log of write commands than write log 22 to even further ensure proper updating of translation table 20 in the event of an unexpected power loss. In the example of write logs 22 that are written at the beginning of each track, footer metadata 28 can act as a bookmark for a most recent write command. As discussed in more detail with reference to FIG. 10, footer metadata 28 can serve to quickly identify when translation table 20 is not up to date upon a power-up of storage device 106. In addition, footer metadata 28 can facilitate the updating process by identifying a range where write logs 22 can be used to update translation table 20 after an unexpected power loss.

If a large number of relatively small write commands requiring footer metadata are written on disk 200, storing footer metadata on disk 200 after each write command can reduce a capacity for user data on disk 200. In other words, a sizable portion of data stored on disk 200 could include footer metadata instead of user data 14. In addition, if such footer metadata were written at the end of each write command throughout a track 210, the resulting fragmentation of user data 14 would worsen the data transfer rate for disk 200. The present disclosure therefore considers storing footer metadata 28 in NVM 128 instead of on disk 200 so as to lessen the effect on a data transfer rate of disk 200 while providing increased data protection.

In addition, by storing footer metadata 28 in NVM 128, it is ordinarily possible to simultaneously write new user data to disk 200 while storing footer metadata in NVM 128. This capability allows for a quicker command completion time in performing writes on disk 200.

FIG. 6 illustrates an example of footer metadata 28 which is stored in NVM 128 to ordinarily avoid decreasing the data transfer rate and user data capacity of disk 200. As shown in FIG. 6, footer metadata 28 includes a mapping for a recent write command on disk 200 for each of SMR zones 226 and 228. Accordingly, footer metadata 28 includes an entry for SMR zone 226 with LBA 4,329 mapping to PBA 2,533 and an entry for SMR zone 228 with LBA 586,360 mapping to PBA 425,742. In one embodiment, each of these entries also includes a sector count which specifies a number of sectors written for the recent write command.

NVM 128 can store one footer metadata entry for each zone on disk 128. Each new write command to a particular zone could then cause the footer metadata entry for the particular zone to be updated for the new write command. In other embodiments, footer metadata 28 may include multiple entries for several of the most recent write commands to a particular zone. In some embodiments, footer metadata 28 may only include entries for particular write commands such as FUA write commands.

In the example of FIG. 6, the most recent write command for SMR zone 226 is at LBA 4,329, which indicates that translation table 20 in FIG. 4 is considered up to date since the last LBA for SMR zone 226 in translation table 20 is also at LBA 4,329. SMR zone 228, on the other hand, has been more recently written than as indicated in translation table 20 of FIG. 4. Specifically, footer metadata 28 in FIG. 6 indicates a recent write at LBA 586,360 but translation table 20 of FIG. 4 indicates a last write for SMR zone 228 at LBA 586,233. If translation table 20 is not properly updated, for example, after an unexpected power loss, footer metadata 28 can be used to update translation table 20 with the most recent write. In addition, footer metadata can also indicate a range on disk 200 in which to search for write logs 22 to fill in translation table 20 for any additional write commands that may not have been updated to translation table 20.

Example Write Processes

Figure 7A:
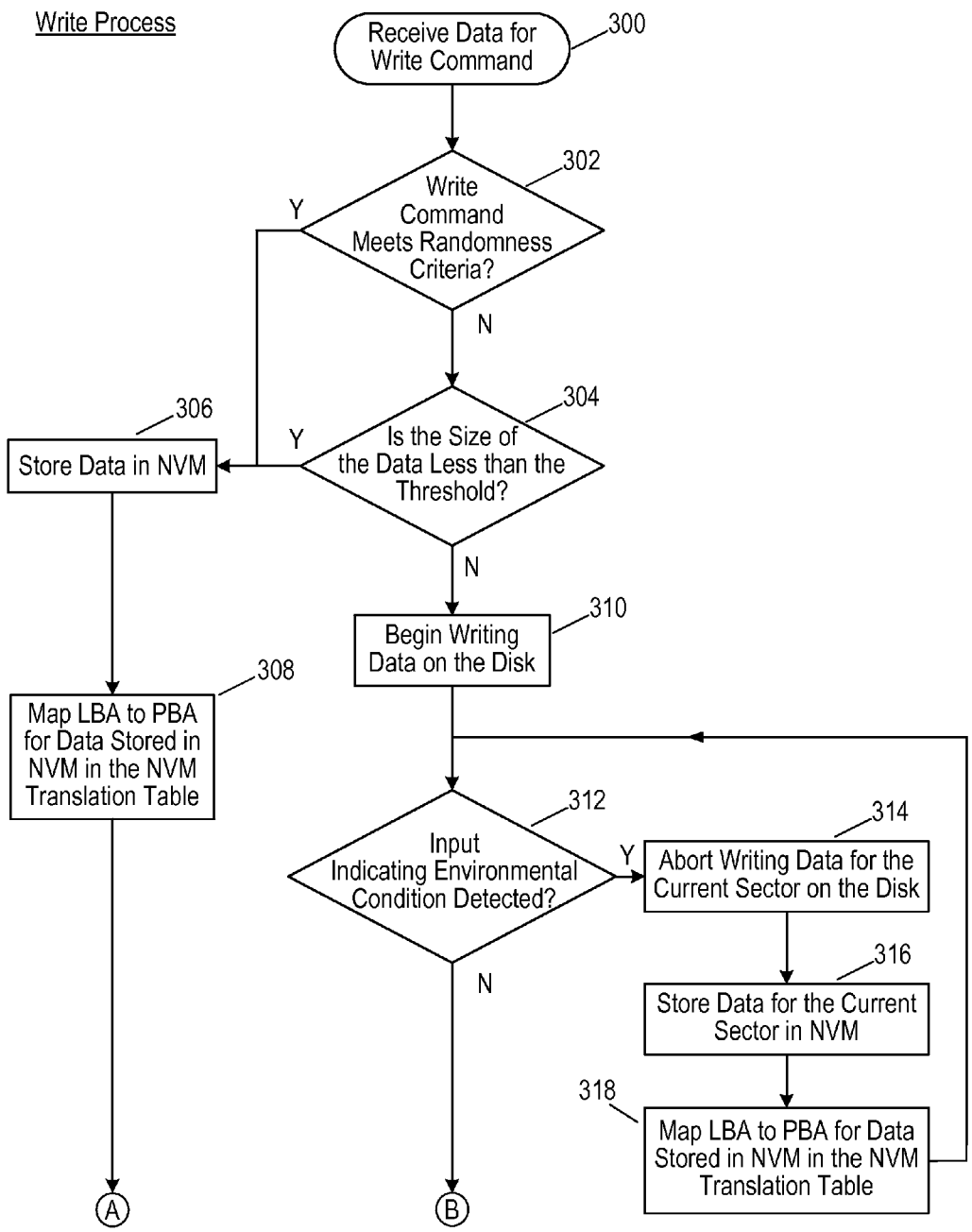
FIG. 7A is a flowchart for a write process according to an embodiment.
Figure 7B:
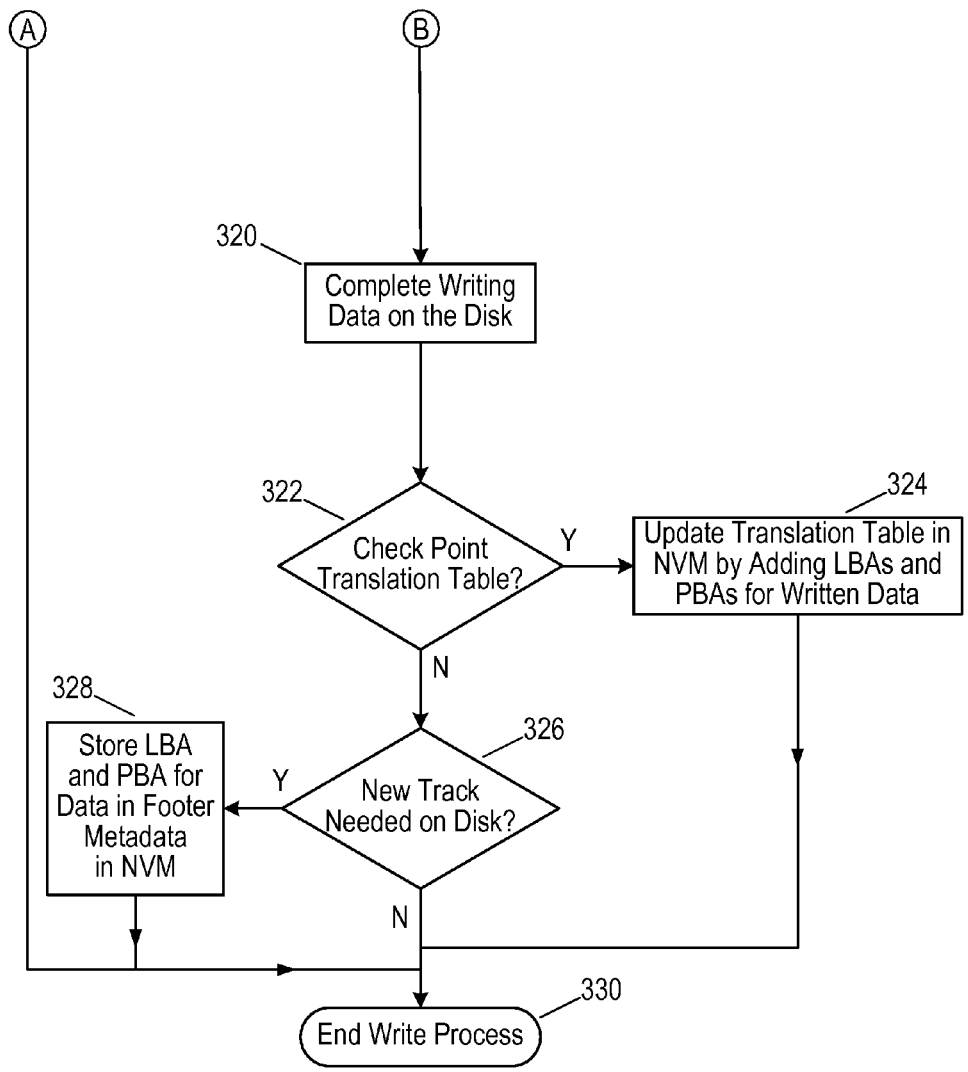
FIG. 7B is a second portion of the flow chart of FIG. 7A.

FIGS. 7A and 7B are a flowchart for an example write process for storage device 106. In block 300, a write command is received by storage device 106 from host 101 via host interface 126. In block 302, controller 122 of storage device 106 determines whether the received write command meets a randomness criteria. Such a randomness criteria can be, for example, whether data to be written for the write command begins at a correct location for sequentially writing data in a particular zone. In such an example, controller 122 may determine whether a first LBA for the write command would be at a location that would sequentially follow a last written sector in a particular zone. If the received write command meets the randomness criteria in block 304, the process proceeds to block 306 where controller 122 stores the data for the write command in NVM 128. By storing data for random write commands in NVM 128, it is ordinarily possible to prevent fragmentation of disk 200 and reduce the penalties associated with read-modify-write operations. Random writes to an SMR zone can especially affect data transfer rates and capacity for SMR zones which are sequentially written. A random write to an SMR zone may create a large gap in the zone having no data in order to maintain sequential writing. By storing random writes in NVM 128, the amount of defragmentation maintenance performed by storage device 106 can ordinarily be reduced.

If the data for the write command does not meet the randomness criteria in block 302, controller 122 checks in block 304 whether the size of the data for the write command is less than a threshold size, such as the data capacity for one track 210 on disk 200. Small writes to disk 200 can increase fragmentation of sequentially written SMR zones and can incur read-modify-write penalties affecting performance and reliability. Accordingly, if it is determined in block 304 that the data to be written is less than the threshold size, controller 122 stores the data in NVM 128 in block 306.

In block 308, controller 122 updates NVM translation table 26 to map the LBAs for data stored in block 306 to the PBAs corresponding to physical locations in NVM 128. The write process then ends in block 330.

If it is determined in block 304 that the data to be written is not less than the threshold size, controller 122 controls storage device 106 to write the data on disk 200 in block 310. In addition to writing the data for the write command, controller 122 controls storage device 106 in block 310 to write any write logs 22 that may be required to log the write command.

In block 312, if controller 122 receives an input from sensor 134 indicating an environmental condition (e.g., a vibration condition, a temperature condition) while writing data, controller 122 aborts writing the data for the current sector 222 in block 314. The data to be written for the current sector 222 is then stored in NVM 128 in block 316. SMR zones can be more susceptible to write errors caused from vibration since the tracks for SMR zones can be relatively narrow. By storing data in NVM 128 during a detected environmental condition, it is ordinarily possible to continue performing the write command despite the environmental condition detected by sensor 134. In block 318, controller 122 updates NVM translation table 26 to include an entry for data written in block 316. The process returns to block 312 to determine whether there is still an environmental condition detected.

If no environmental condition is detected in block 312, controller 122 controls storage device 106 to complete writing the data on disk 200 in block 320. In block 322, controller 122 determines whether translation table 20 should be check-pointed. This determination can be made, for example, if a certain amount of data has been written since a previous check-pointing of translation table 20, when a predetermined amount of time has expired since a last check-pointing, or if an error was encountered when writing data on disk 200. In block 324, controller 122 check-points translation table 20 in NVM 128 by updating translation table 20 with entries for recently written data. The LBAs and PBAs for updating translation table 20 can come from reading write logs 22 stored on disk 200 since a last entry in translation table 20. The updating in block 324 can be performed for a particular zone for the received write command or can be performed for multiple zones.

In block 326, controller 122 determines whether a new track 210 was needed in writing data on disk 200. If so, footer metadata 28 is stored in NVM 128 to log the write command. The write process then ends in block 330.

Figure 8:
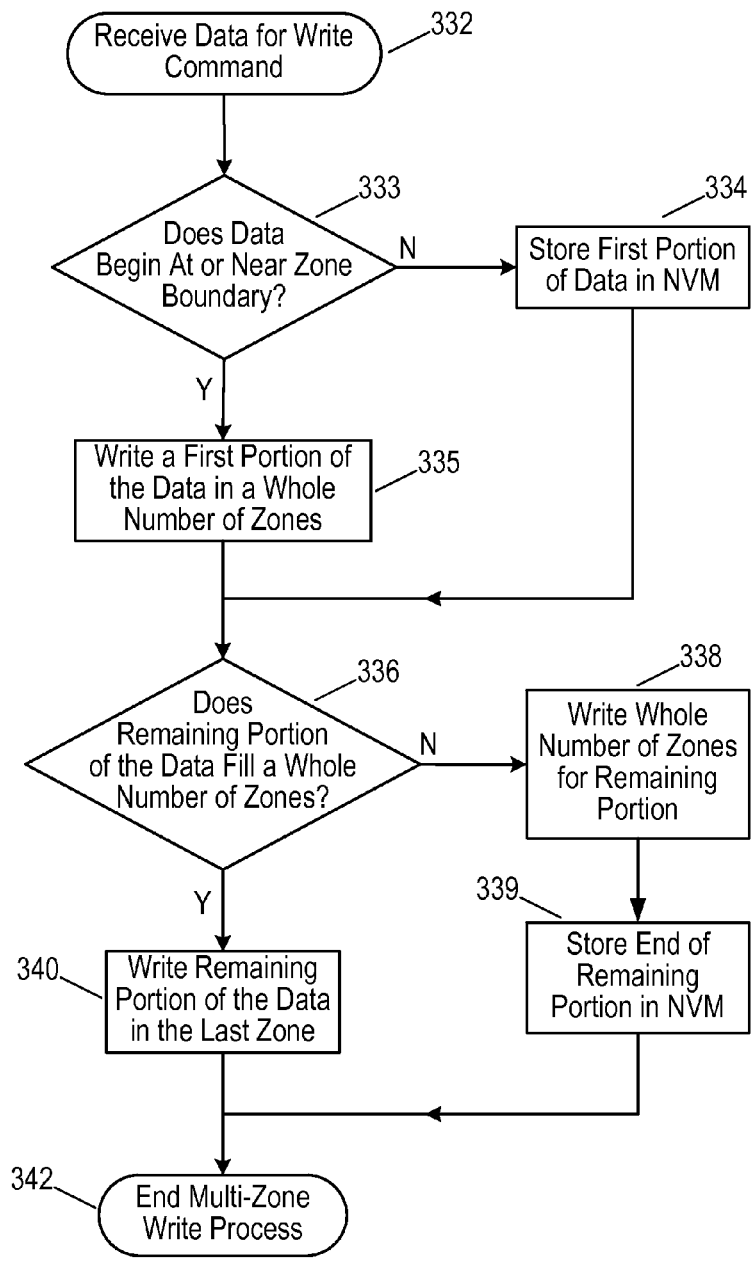
FIG. 8 is a flowchart for a multi-zone write process according to an embodiment.

FIG. 8 depicts an example write process for a write command that extends over more than one zone on disk 200. The write process of FIG. 8 illustrates how NVM 128 can be used to store a beginning and/or ending portion of data for a multi-zone write command so as to generally align the data written on disk 200 with zone boundaries. By aligning data with zone boundaries, it is ordinarily possible to increase the storage capacity of disk 200 since data extending over multiple zones might otherwise involve leaving a large portion of a zone empty to maintain sequential writing.

In block 332 of FIG. 8, a write command is received by storage device 106 from host 101 via host interface 126. In block 333, controller 122 determines whether the data for the received write command would begin at or near a boundary between a first zone and a second zone if the data were written on disk 200. In determining whether the data begins at or near a boundary it might be sufficient if the data begins within a certain number of LBAs after a zone boundary such as after 1% to 3% of all addresses in a first zone for the write command.

Figure 9A:
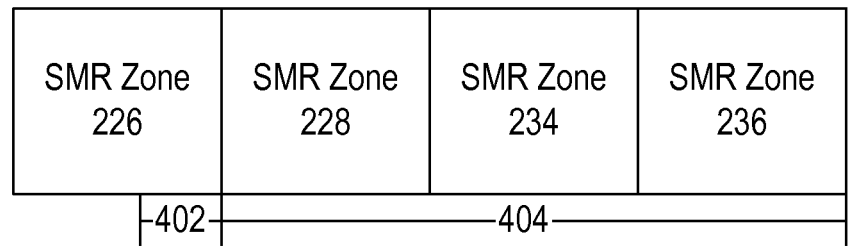
FIG. 9A illustrates an example of writing data to multiple zones.

FIG. 9A provides an example where the data for a write command does not begin at or near a zone boundary. As shown in FIG. 9A, a first data portion 402 would begin in the middle of SMR zone 226. Accordingly, controller 122 would determine in block 333 that the data for the received write command would not begin at or near the boundary between SMR zones 226 and 228.

Returning to FIG. 8, if it is determined in block 333 that the data would not begin at or near a zone boundary, controller 122 in block 334 stores a first portion of the data in NVM 128 so that a size of the first portion of the data approximately matches a size of a remaining unwritten portion of the first zone. In the example of FIG. 9A, first data portion 402 is stored in NVM 128 instead of writing first data portion 402 in SMR zone 226.

The process of FIG. 8 then proceeds to block 336 where controller 122 determines whether the remaining portion of the data would substantially fill a whole number of zones. As with the determination in block 333, it may be sufficient if the data for the write command ends before a certain address near the end of a last zone for the write command. For example, a last address within 1% to 3% of the last address in the zone may be sufficient. In the example of FIG. 9A, the remaining portion of the data would substantially fill a whole number of zones. Specifically, second data portion 402 substantially fills a whole number of zones of SMR zones 228, 234 and 236.

If it is determined that the remaining portion of the data for the write command would not substantially fill a whole number of zones, controller 122 in block 338 of FIG. 8 controls storage device 106 to write a whole number of zones for the remaining portion.

If the remaining portion does not extend over more than one zone, block 338 is not performed. For example, the remaining portion may only include half of the data needed to substantially fill a zone. In this case, block 338 would be skipped. On the other hand, if the remaining portion included enough data to cover two and a half zones, the data for the two whole zones would be written in block 338.

In block 339, controller 122 stores the end of the remaining portion in NVM 128. The end of the remaining portion would only cover a fractional portion of a zone on disk 200. The multi-zone write process then ends in block 342.

If controller 122 determines that data would begin at or near a zone boundary, controller 122 controls storage device 106 to write a first portion of the data in a whole number of zones in block 335. In block 336, controller 122 determines whether a remaining portion of the data would substantially fill a whole number of zones. If not, the process proceeds to blocks 338 and 339 as described above. If it is determined that the remaining portion of the data would substantially fill a whole number of zones, controller 122 controls storage device 106 in block 340 to write the remaining portion of the data in the whole number of zones on disk 200. The multi-zone write process then ends in block 342.

Figure 9B:
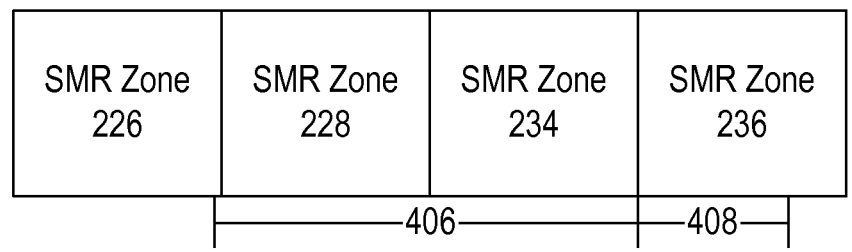
FIG. 9B illustrates another example of writing data to multiple zones.

FIG. 9B illustrates an example where a remaining portion of the data would not substantially fill a whole number of zones. As shown in FIG. 9B, first data portion 406 begins near the boundary between SMR zone 226 and SMR zone 228. First data portion 406 is therefore written to the whole number of zones of SMR zones 228 and 234 in block 335 of FIG. 8. On the other hand, second data portion 408 would not substantially fill a whole number of zones (i.e., SMR zone 236). Accordingly, second data portion 408 is stored to NVM 128 in block 339 of FIG. 8.

Example Power-Up Check Process and Example Power Loss Process

Figure 10:
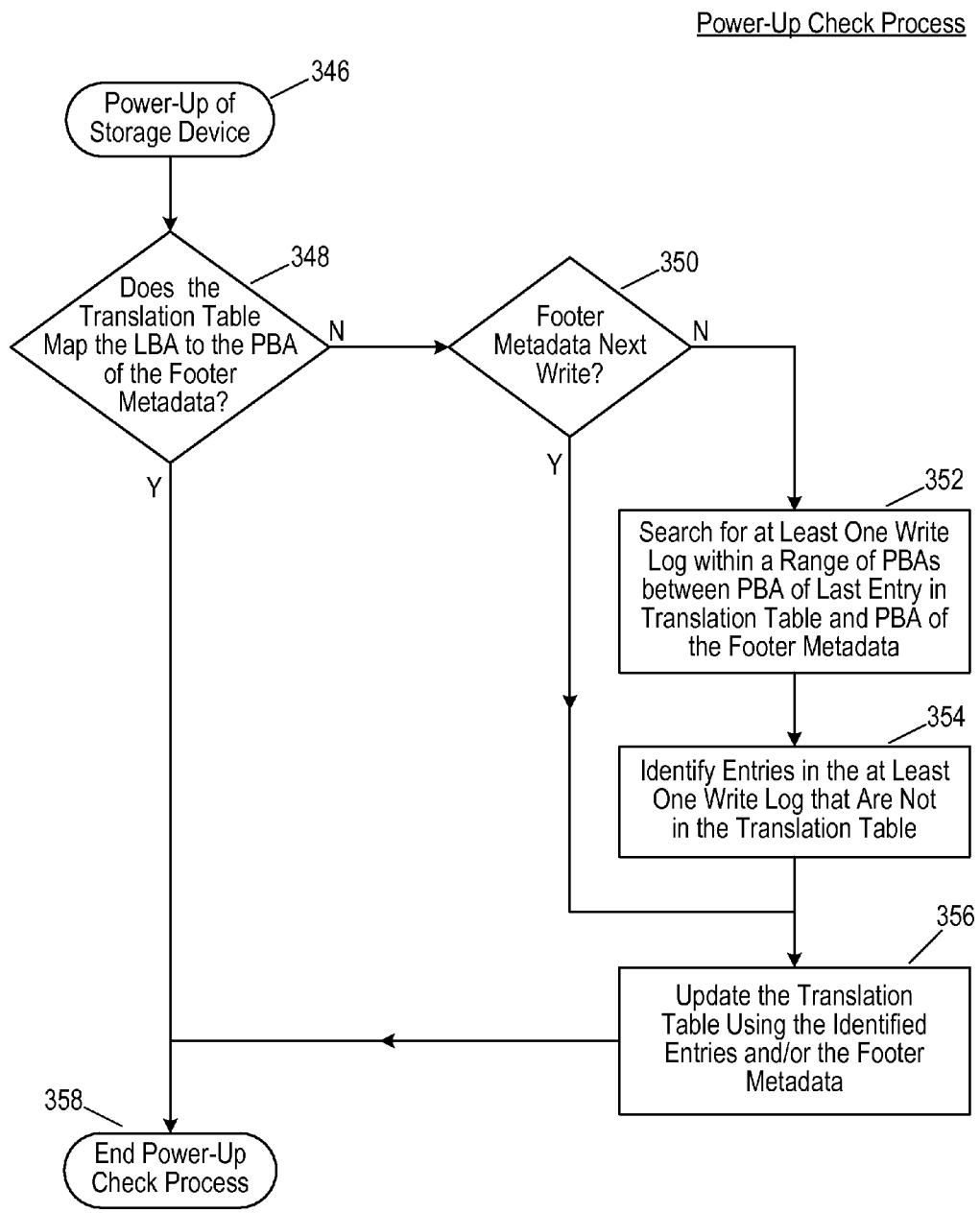
FIG. 10 is a flowchart for a power-up process according to an embodiment.

FIG. 10 is a flowchart for a power-up check process that can be performed by controller 122 upon a power-up of storage device 106. The example process of FIG. 10 can be performed to check if translation table 20 was properly updated during a powering down of storage device 106. This process can be performed for each zone on disk 200.

In block 346, storage device 106 is powered-up and controller 122 in block 348 determines whether the LBA and PBA of footer metadata 28 is stored in translation table 20. This check ordinarily allows controller 122 to determine if translation table 20 has been updated with an entry for the most recent write command logged in footer metadata 28. If translation table 20 includes an entry for the LBA and PBA of footer metadata 28, the power-up check process ends in block 358 since translation table 20 seems up to date.

If translation table 20 does not include an entry corresponding to footer metadata 28, then controller 122 checks whether footer metadata 28 represents a next most recent write in block 350. In more detail, controller 122 may compare the PBA and sector count stored in footer metadata 28 with the last PBA stored in translation table 20 to determine if footer metadata 28 represents the next write from the last entry in translation table 20. For example, if the PBA stored in footer metadata 28 is 425,742 and the sector count is 116, controller 122 would determine in block 350 that footer metadata 28 represents a next write for SMR zone 228 if the last PBA in translation table 20 is 425,626. This is due to the difference in PBAs of footer metadata 28 and translation table 20 equaling the sector count. Controller 122 then updates translation table 20 in block 356 with the LBA and PBA from footer metadata 28. The power-up check process then ends in block 358.

If it is determined in block 350 that footer metadata 28 does not represent a next write, controller 122 searches for at least one write log 22 on disk 200 within a range of PBA's between a last PBA in translation table 20 and the PBA of footer metadata 28. In block 354, controller 122 identifies entries in the at least one write log 22 that are not in translation table 20. These entries correspond to logged write commands that have occurred since translation table 20 was last updated. Thus, in block 356, controller 122 updates translation table 20 using the identified entries from block 354 and footer metadata 28. The power-up check process then ends in block 358.

Figure 11:
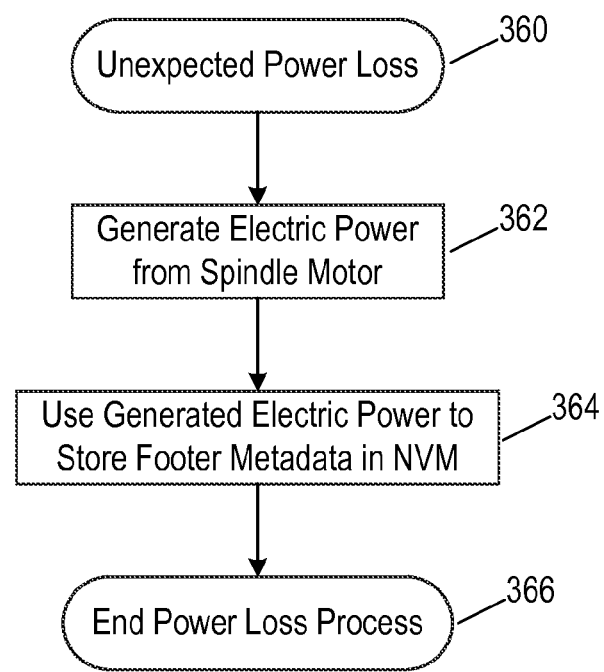
FIG. 11 is a flowchart for a power loss process according to an embodiment.

FIG. 11 is a flowchart for an example process performed by controller 122 when there is an unexpected power loss to storage device 106. When there is an unexpected power loss in block 360, controller 122 controls power controller 136 to receive electric power generated by SM 138 resulting from a continued rotation of SM 138. In block 364, the generated electric power is used by controller 122 to store footer metadata 28 in NVM 128 for an active zone that has been recently written. In some embodiments, the size of footer metadata 28 may correspond to an amount of electric power that can usually be recovered from continued rotation of SM 138 after a power loss. For example, if the electric power generated from SM 138 can usually be used by controller 122 to store 32K bytes of data in NVM 128, the size for each footer metadata 28 could be 8K bytes to enable storage of footer metadata 28 for up to four active zones. After storing footer metadata 28 in block 364, the power loss process ends in block 366.

CONCLUSION

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A storage device comprising:
   a disk for storing data associated with a plurality of logical block addresses (LBAs);
   a non-volatile memory (NVM) for storing a translation table mapping each of the plurality of LBAs to a respective physical block address (PBA) identifying a physical location on the disk storing the data associated with the LBA; and
   a controller configured to:
      store footer metadata in the NVM including an LBA associated with recently written data and a PBA identifying a physical location of the recently written data on the disk; and
      after a powering-up of the storage device:
      determine if the translation table maps the LBA of the footer metadata to the PBA of the footer metadata; and
      when the translation table is determined not to map the LBA of the footer metadata to the PBA of the footer metadata:
         search for at least one write log in a range between a physical location on the disk corresponding to a PBA of a last entry in the translation table and a physical location corresponding to the PBA of the footer metadata;
         identify entries in the at least one write log that are not in the translation table; and
         update the translation table using the identified entries in the at least one write log and the footer metadata.

2. The storage device of claim 1, further comprising a spindle motor for rotating the disk,
   wherein the spindle motor is constructed to generate electric power from a continued rotation of the disk when there is a loss of power to the storage device, and
   wherein the generated electric power is used by the storage device to store the footer metadata in the NVM for the recently written data.

3. The storage device of claim 1, wherein the disk includes a plurality of overlapping tracks for storing data.

4. The storage device of claim 1, wherein the NVM includes a NAND flash memory and/or a NOR flash memory.

5. The storage device of claim 1, wherein the controller is further configured to:
   determine if a size of data associated with an LBA is less than a threshold;

store the data in the NVM when the size of the data is less than the threshold; and when the size of the data is not less than the threshold, control the storage device to write the data on the disk.

6. The storage device of claim 1, wherein the controller is further configured to:

receive an input indicating an environmental condition; and in response to receiving the input indicating the environmental condition, control the storage device to abort writing data on the disk and store the data in the NVM.

7. The storage device of claim 6, wherein the environmental condition includes a vibration condition.

8. The storage device of claim 1, wherein the disk includes a plurality of tracks for storing data, with the plurality of tracks grouped into a plurality of zones of tracks, and wherein the controller is further configured to:

control the storage device to write a first portion of data associated with a range of LBAs in at least one zone of the plurality of zones; and store a second portion of the data associated with the range of LBAs in the NVM when the second portion of the data would not substantially fill a second zone of the plurality of zones.

9. The storage device of claim 1, wherein the controller is further configured to:

determine whether an LBA associated with data to be stored in the storage device sequentially follows a last written LBA on the disk;

when the LBA associated with the data to be stored sequentially follows the last written LBA, control the storage device to write the data associated with the LBA on the disk; and when the LBA associated with the data to be stored does not sequentially follow the last written LBA, store the data associated with the LBA in the NVM.

10. The storage device of claim 1, wherein the controller is further configured to:

identify a defective portion of the disk;

read data adjacent the defective portion; and store the data read in the NVM.

11. The storage device of claim 1, wherein the disk includes a plurality of tracks for storing data, with the plurality of tracks grouped into a plurality of zones of tracks, and wherein the controller is further configured to:

determine whether data to be stored in the storage device would begin at or near a boundary between a first zone and a second zone if the data were written on the disk;

when it is determined the data would begin at or near the boundary, control the storage device to write the data on the disk; and when it is determined the data would not begin at or near the boundary:

store a first portion of the data in the NVM, wherein a size of the first portion of the data approximately matches a size of a remaining unwritten portion of the first zone; and control the storage device to write a second portion of the data following the first portion beginning at or near the boundary between the first and second zones.

12. A method for managing data in a storage device including a disk for storing data associated with a plurality of logical block addresses (LBAs) and a non-volatile memory (NVM) for storing a translation table mapping each of the plurality of LBAs to a respective physical block address (PBA) identifying a physical location on the disk storing the data associated with the LBA, the method comprising:

storing footer metadata in the NVM including an LBA associated with recently written data and a PBA identifying a physical location of the recently written data on the disk;

wherein after a powering-up of the storage device, the method further comprises:

determining if the translation table maps the LBA of the footer metadata to the PBA of the footer metadata; and when the translation table is determined not to map the LBA of the footer metadata to the PBA of the footer metadata:

searching for at least one write log in a range between a physical location on the disk corresponding to a PBA of a last entry in the translation table and a physical location corresponding to the PBA of the footer metadata;

identifying entries in the at least one write log that are in the translation table; and updating the translation table using the identified entries in the at least one write log and the footer metadata.

13. The method of claim 12, wherein the method further comprises:

generating electric power from a continued rotation of the disk when there is a loss of power to the storage device, and using the generated electric power to store the footer metadata in the NVM for the recently written data.

14. The method of claim 12, wherein the disk includes a plurality of overlapping tracks for storing data.

15. The method of claim 12, wherein the NVM includes a NAND flash memory and/or a NOR flash memory.

16. The method of claim 12, further comprising:

determining whether a size of data associated with an LBA is less than a threshold;

storing the data in the NVM when the size of the data is determined less than the threshold; and when the size of the data is determined not less than the threshold, writing the data on the disk.

17. The method of claim 12, further comprising:

receiving an input indicating an environmental condition; and in response to receiving the input indicating the environmental condition, aborting writing data on the disk and storing the data in the NVM.

18. The method of claim 17, wherein the environmental condition includes a vibration condition.

19. The method of claim 12, wherein the disk includes a plurality of tracks for storing data, with the plurality of tracks grouped into a plurality of zones of tracks, and wherein the method further comprises:

writing a first portion of data associated with a range of LBAs in at least one zone of the plurality of zones; and storing a second portion of the data associated with the range of LBAs in the NVM when the second portion of the data would not substantially fill a second zone of the plurality of zones.

20. The method of claim 12, further comprising:

determining whether an LBA associated with data to be stored in the storage device sequentially follows a last written LBA on the disk;

when the LBA associated with the data to be stored is determined to sequentially follow the last written LBA, writing the data associated with the LBA on the disk; and when the LBA associated with the data to be stored is determined to not sequentially follow the last written LBA, storing the data associated with the LBA in the NVM.

21. The method of claim 12, further comprising:
identifying a defective portion of the disk;
reading data adjacent the defective portion; and
storing the data read in the NVM.

22. The method of claim 12, wherein the disk includes a plurality of tracks for storing data, with the plurality of tracks grouped into a plurality of zones of tracks, and wherein the method further comprises:
determining whether data to be stored in the storage device would begin at or near a boundary between a first zone and a second zone if the data were written on the disk;
when it is determined the data would begin at or near the boundary, writing the data on the disk; and
when it is determined the data would not begin at or near the boundary:
storing a first portion of the data in the NVM, wherein a size of the first portion of the data approximately matches a size of a remaining unwritten portion of the first zone; and
writing a second portion of the data following the first portion beginning at or near the boundary between the first and second zones.

23. A non-transitory computer-readable storage medium storing computer-executable instructions for operating a storage device including a disk for storing data associated with a plurality of logical block addresses (LBAs) and a non-volatile memory (NVM) for storing a translation table mapping each of the plurality of LBAs to a respective physical block address (PBA) identifying a physical location on the disk storing the data associated with the LBA, wherein when the computer-executable instructions are executed by a processor, the processor:
stores footer metadata in the NVM including an LBA associated with recently written data and a PBA identifying a physical location of the recently written data on the disk; and
wherein when the computer-executable instructions are executed by the processor after a powering-up of the storage device, the processor further:
determines if the translation table maps the LBA of the footer metadata to the PBA of the footer metadata; and
when the translation table is determined not to map the LBA of the footer metadata to the PBA of the footer metadata, the processor:
searches for at least one write log in a range between a physical location on the disk corresponding to a PBA of a last entry in the translation table and a physical location corresponding to the PBA of the footer metadata;
identifies entries in the at least one write log that are not in the translation table; and
updates the translation table using the identified entries in the at least one write log and the footer metadata.

24. The non-transitory computer-readable storage medium of claim 23, wherein when the computer-executable instructions are executed by the processor, the processor further:
controls the storage device to generate electric power from a continued rotation of the disk when there is a loss of power to the storage device, and
uses the generated electric power to store the footer metadata in the NVM for the recently written data.

25. The non-transitory computer-readable storage medium of claim 23, wherein the disk includes a plurality of overlapping tracks for storing data.

26. The non-transitory computer-readable storage medium of claim 23, wherein the NVM includes a NAND flash memory and/or a NOR flash memory.

27. The non-transitory computer-readable storage medium of claim 23, wherein when the computer-executable instructions are executed by the processor, the processor further:
determines whether a size of data associated with an LBA is less than a threshold;
stores the data in the NVM when the size of the data is determined less than the threshold; and
when the size of the data is determined not less than the threshold, writes the data on the disk.

28. The non-transitory computer-readable storage medium of claim 23, wherein when the computer-executable instructions are executed by the processor, the processor further:
receives an input indicating an environmental condition; and
in response to receiving the input indicating the environmental condition, aborts writing data on the disk and stores the data in the NVM.

29. The non-transitory computer-readable storage medium of claim 28, wherein the environmental condition includes a vibration condition.

30. The non-transitory computer-readable storage medium of claim 23, wherein the disk includes a plurality of tracks for storing data, with the plurality of tracks grouped into a plurality of zones of tracks, and wherein when the computer-executable instructions are executed by the processor, the processor further:
writes a first portion of data associated with a range of LBAs in at least one zone of the plurality of zones; and
stores a second portion of the data associated with the range of LBAs in the NVM when the second portion of the data would not substantially fill a second zone of the plurality of zones.

31. The non-transitory computer-readable storage medium of claim 23, wherein when the computer-executable instructions are executed by the processor, the processor further:
determines whether an LBA associated with data to be stored in the storage device sequentially follows a last written LBA on the disk;
when the LBA associated with the data to be stored is determined to sequentially follow the last written LBA, writes the data associated with the LBA on the disk; and
when the LBA associated with the data to be stored is determined to not sequentially follow the last written LBA, stores the data associated with the LBA in the NVM.

32. The non-transitory computer-readable storage medium of claim 23, wherein when the computer-executable instructions are executed by the processor, the processor further:
identifies a defective portion of the disk;
reads data adjacent the defective portion; and
stores the data read in the NVM.

33. The non-transitory computer-readable storage medium of claim 23, wherein the disk includes a plurality of tracks for storing data, with the plurality of tracks grouped into a plurality of zones of tracks, and wherein when the processor executes the computer-executable instructions, the processor further:
determines whether data to be stored in the storage device would begin at or near a boundary between a first zone and a second zone if the data were written on the disk;
when it is determined the data would begin at or near the boundary, writes the data on the disk; and
when it is determined the data would not begin at or near the boundary, the processor:

stores a first portion of the data in the NVM, wherein a size of the first portion of the data approximately matches a size of a remaining unwritten portion of the first zone; and writes a second portion of the data following the first portion beginning at or near the boundary between the first and second zones.

34. A storage device comprising:
a disk for storing data associated with a plurality of logical block addresses (LBAs), wherein the disk includes a plurality of tracks for storing data, with the plurality of tracks grouped into a plurality of zones of tracks;
a non-volatile memory (NVM) for storing a translation table mapping each of the plurality of LBAs to a respective physical block address (PBA) identifying a physical location on the disk storing the data associated with the LBA; and
a controller configured to:
control the storage device to write a first portion of data associated with a range of LBAs in at least one zone of the plurality of zones; and
store a second portion of the data associated with the range of LBAs in the NVM when the second portion of the data would not substantially fill a second zone of the plurality of zones.

35. A method for managing data in a storage device including a disk for storing data associated with a plurality of logical block addresses (LBAs) and a non-volatile memory (NVM) for storing a translation table mapping each of the plurality of LBAs to a respective physical block address (PBA) identifying a physical location on the disk storing the data associated with the LBA, wherein the disk includes a plurality of tracks for storing data, with the plurality of tracks grouped into a plurality of zones of tracks, the method comprising:
writing a first portion of data associated with a range of LBAs in at least one zone of the plurality of zones; and
storing a second portion of the data associated with the range of LBAs in the NVM when the second portion of the data would not substantially fill a second zone of the plurality of zones.

36. A storage device comprising:
a disk for storing data associated with a plurality of logical block addresses (LBAs);
a non-volatile memory (NVM) for storing a translation table mapping each of the plurality of LBAs to a respective physical block address (PBA) identifying a physical location on the disk storing the data associated with the LBA; and
a controller configured to:
identify a defective portion of the disk;
read data adjacent the defective portion; and
store the data read in the NVM.

37. A method for managing data in a storage device including a disk for storing data associated with a plurality of logical block addresses (LBAs) and a non-volatile memory (NVM) for storing a translation table mapping each of the plurality of LBAs to a respective physical block address (PBA) identifying a physical location on the disk storing the data associated with the LBA, the method comprising:
identifying a defective portion of the disk;
reading data adjacent the defective portion; and
storing the data read in the NVM.

38. A storage device comprising:
a disk for storing data associated with a plurality of logical block addresses (LBAs), wherein the disk includes a plurality of tracks for storing data, with the plurality of tracks grouped into a plurality of zones of tracks;
a non-volatile memory (NVM) for storing a translation table mapping each of the plurality of LBAs to a respective physical block address (PBA) identifying a physical location on the disk storing the data associated with the LBA; and
a controller configured to:
determine whether data to be stored in the storage device would begin at or near a boundary between a first zone and a second zone if the data were written on the disk;
when it is determined the data would begin at or near the boundary, control the storage device to write the data on the disk; and
when it is determined the data would not begin at or near the boundary:
store a first portion of the data in the NVM, wherein a size of the first portion of the data approximately matches a size of a remaining unwritten portion of the first zone; and
control the storage device to write a second portion of the data following the first portion beginning at or near the boundary between the first and second zones.

39. A method for managing data in a storage device including a disk for storing data associated with a plurality of logical block addresses (LBAs) and a non-volatile memory (NVM) for storing a translation table mapping each of the plurality of LBAs to a respective physical block address (PBA) identifying a physical location on the disk storing the data associated with the LBA, wherein the disk includes a plurality of tracks for storing data, with the plurality of tracks grouped into a plurality of zones of tracks, the method comprising:
determining whether data to be stored in the storage device would begin at or near a boundary between a first zone and a second zone if the data were written on the disk;
when it is determined the data would begin at or near the boundary, writing the data on the disk; and
when it is determined the data would not begin at or near the boundary:
storing a first portion of the data in the NVM, wherein a size of the first portion of the data approximately matches a size of a remaining unwritten portion of the first zone; and
writing a second portion of the data following the first portion beginning at or near the boundary between the first and second zones.

* * * * *